UNITED STATES PATENT OFFICE.

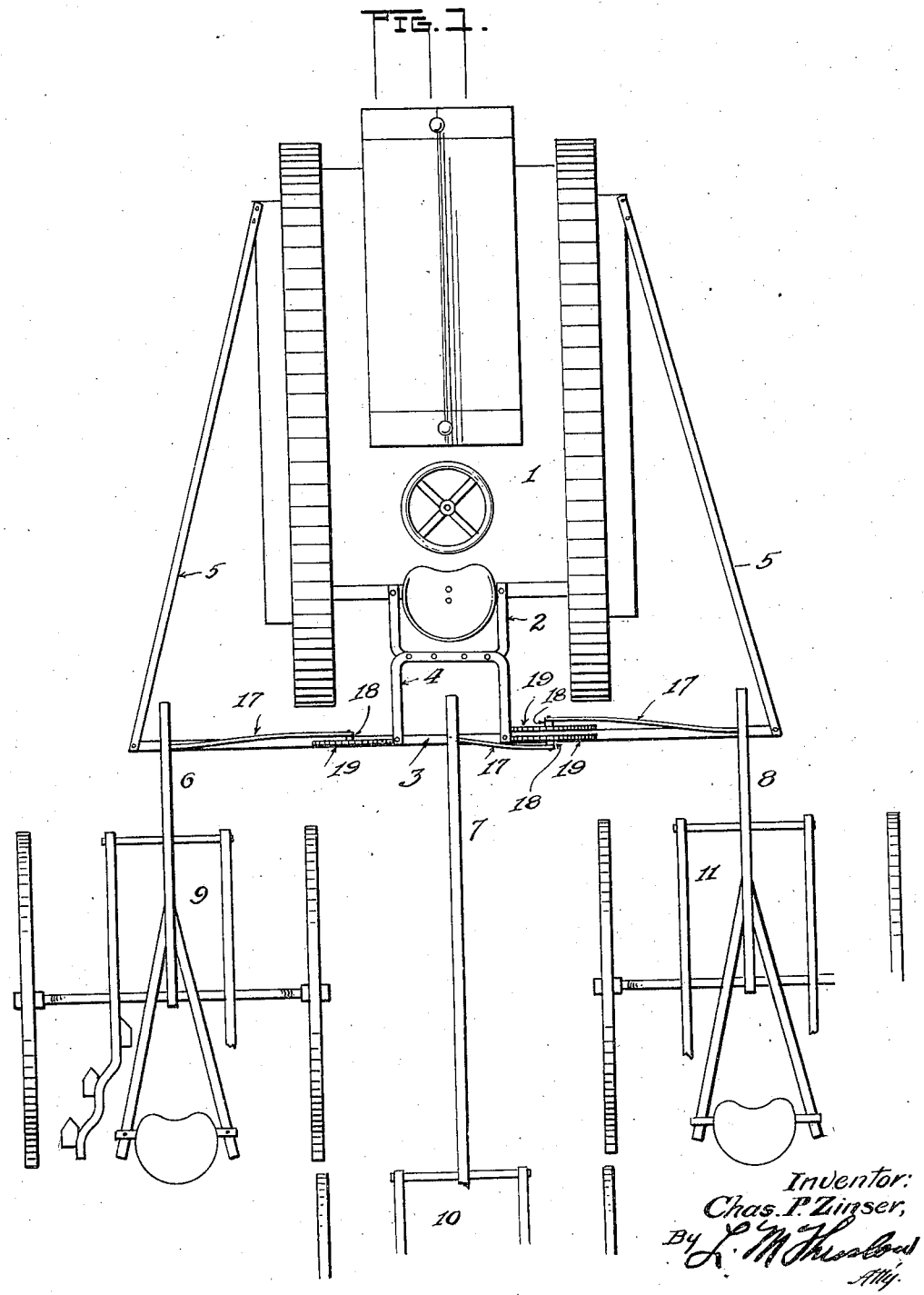

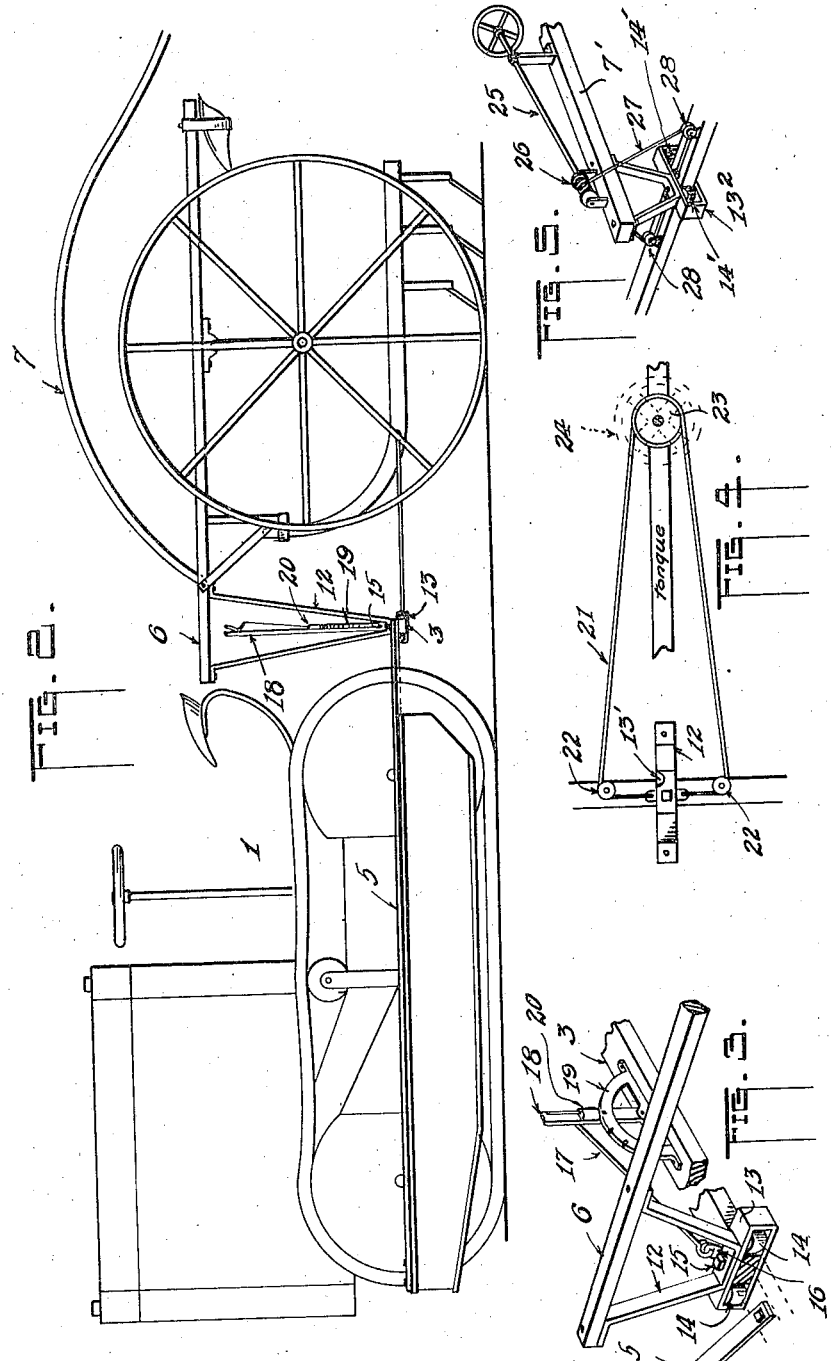

CHARLES P. ZINSER, OF WASHINGTON, ILLINOIS.

DRAFT CONNECTION FOR EARTH-STIRRING IMPLEMENTS.

1,353,620.      Specification of Letters Patent.      Patented Sept. 21, 1920.

Application filed October 29, 1919. Serial No. 334,144.

*To all whom it may concern:*

Be it known that I, CHARLES P. ZINSER, a citizen of the United States, residing at Washington, in the county of Tazewell and State of Illinois, have invented certain new and useful Improvements in Draft Connections for Earth-Stirring Implements; and I do hereby declare that the following is a full, clear, and exact description of the invention, which will enable others skilled in the art to which it appertains to make and use the same.

This invention has reference to a draft connection for earth-stirring implements. It relates more particularly to a draft connection between a tractor and a series of two or more cultivators, together with mechanism for positioning the cultivator, or other implement, with respect to the said draft connection and the particular line to be followed.

The main object of my invention is the provision of a draft device rigidly secured to the rear of a tractor by means of which a series of earth-stirring implements, such as cultivators, may be attached so that all may work as a unit to the end that a large territory may be covered in one operation.

Another object is the provision of mechanism of such a nature that an operator may adjust the implement, especially if a cultivator, with respect to the draft device, and with respect to the row of plants being cultivated.

A still further object is that of providing a draft device for attachment to a power machine such as a tractor, for connection thereto of a series of implements, said device being removable in order to permit the tractor to be used for other purposes and in order that the attachment will not be in the way.

To the end that my invention may be clearly understood the accompanying drawings have been provided showing a preferred embodiment of the invention, it being understood that changes may be made therein within the meaning and intent of said invention and the appended claims.

Figure 1 is a plan of a tractor and my draft rigging attached at its rear showing a series of cultivators drawn thereby.

Fig. 2 is a side elevation of the same.

Fig. 3 shows, in perspective, a manner of adjusting the cultivator tongue with respect to a draft bar carried by the tractor.

Fig. 4 is a plan of a modified form of control having the same object in view, and Fig. 5 is still another modification of control.

1 is indicative of a tractor of any desired type for drawing behind it the implements for plowing, cultivating or harrowing. 2 is a yoke secured to some portion of the tractor framing or body, as sometimes provided, 3 is a draft bar of any suitable or desired form, to which is attached forwardly thereof a suitable member such as a yoke 4, for example, connected in any suitable manner to the described yoke 2.

Attached to each end of the draft bar 3, which may extend as far as desired each side of the tractor, is one end of a draft bar 5, whose other end is attached forwardly to some suitable portion of the frame or body of said tractor.

The connections thus described serve to firmly and rigidly attach said draft bar, but other and additional bracing means may be employed if desired. The bar 3 and its parts can be detached of course at any time it is desired to use the tractor for other purposes than that of cultivating or other field work.

6, 7 and 8 indicate the tongues of, in this case, a series of three independent cultivators 9, 10 and 11, respectively, to be drawn behind the said draft bar 3.

In practice the tractor in its forward movement cannot well be directed to draw the implements in the rear each in its proper relation to the row to be cultivated. Consequently, it is my design and purpose to provide means for adjusting the tongues 6, 7 and 8 with respect to the draft-bar so that each implement can be independently brought to its required proper position to properly cultivate the row of plants corresponding thereto.

This object may be accomplished in various ways, I having shown as examples three methods for so doing.

These different methods are illustrated in Figs. 3, 4 and 5, that in said Fig. 3 first receiving attention herein.

First, however, the support for the implement tongue may be described as applicable to all three forms.

12 is a supporting brace or stirrup secured to the under side of the tongue whose lower extremity is designed to rest upon the draft-bar, spacing the tongue above it, there being interposed between the stirrup and the draft-bar a frame 13 inclosing the latter and carrying rollers 14 to engage the front and rear faces of said bar, the stirrup being pivoted to said frame by means of a bolt 15, for example.

Now, extending from one side of the frame 13 is an ear 16 to which is pivoted one end of a rod 17 whose other end has pivoted connection with a lever 18 mounted on the draft-bar near the seat of the operator of the tractor, there being a notched sector 19 to which the lever is pivoted, the latter having any usual latch mechanism 20.

This structure it is observed is provided for each of the tongues 6, 7 and 8 or as many more as it may be the desire or ability to accommodate.

In this connection it is observed that the middle tongue 7 of the three shown is of considerable length in order that the middle cultivator in traversing its row will have a position behind the others where it will have space to operate. And in order, also, that its tongue in the side movement thereof may not interfere with the wheels of the other two implements it is arched, as shown in Fig. 2, to bring it above said wheels.

In the second method of swinging the tongue the frame 13', Fig. 4, corresponding to 13, has the ends of a cable 21 attached thereto, each then passing around a pulley 22 on the reach, one at each side of the said frame 13' as shown, the said cable thence taking several turns around and fastened to a drum 23 mounted on the implement. 24 indicates a hand wheel by which the drum may be turned one way or the other whereby to shift the tongue relatively to the draft-bar as in the other instance.

Fig. 5, which illustrates the third method, is not greatly unlike the one just described. Upon the tongue is mounted a shaft 25 extending to near the seat of the operator of the implement and having a drum 26 upon which a cable 27 is wrapped which takes around opposite pulleys 28 corresponding to pulley 22 of Fig. 4, thence having connection with the frame 13².

The last two described forms permit the operator of any given implement to control the direction of travel of his implement whereas in the first form, Fig. 3, an operator on the tractor is enabled to control the several implements from that point.

The rigidly mounted draft-bar of considerable length, it is now clear, serves as a connection for a series of implements whereby a considerable territory may be gone over in one operation, whether cultivating or harrowing.

In this connection it is observed that the draft-bar is connected to the tractor at widely spaced positions. That is to say, the forward ends of the members 5 where they connect to the machine are widely spaced from the point of connection of the draft-bar with the yoke 2, and since the members are rigid throughout they assist in holding the bar from teetering and prevent any tendency to a see-sawing motion when the draft upon the bar may vary when, for example, the cultivator shovels of one of the implements may be out of the ground while the others are in action. Furthermore, when cultivating, although the tractor may not maintain a straight line of travel the implements may be kept closely up to their work so as to produce the best possible cultivation.

Although some such methods as are described herein are preferred for the guiding of the implement, others may be used, keeping in mind the fact that in turning around in the field the mechanism used for the steering must be such that it will not interfere with or itself be disarranged as the tongue swings to wide limits, and for this reason the drums 23, 26 are preferably left free to rotate at such times by the pull of the cables thereon.

I claim:

1. In a draft rigging, in combination with a tractor, a single draft-bar for attachment thereto of a series of earth stirring implements, said bar having rigid attachment to the said tractor and supported entirely thereby, and a member at each end of the draft-bar connected at one end thereto, and connected each at its other end to the tractor forward of the place of attachment of said bar, all of the parts being rigid with respect to one another and with respect to the tractor.

2. In combination with a tractor, a part secured thereto, a draft-bar attached substantially at the middle of its length to said part, said draft-bar having a length to admit of the attachment of a series of cultivators thereto, and a member attached to each end of the draft-bar and each also attached to the tractor in rigid manner, the said part and said members securing the said draft-bar in fixed relation to the frame of the tractor.

3. In combination with a traction engine, a draft attachment therefor including a single rigid bar rigidly attached to said engine perpendicular to the line of draft, means for independently connecting each of a series of cultivators to said bar to be drawn behind the same, each having its tongue supported by said bar, and separate means operatively engaging each tongue and said bar for imparting independent lateral movement to each tongue longitudinally of said bar.

4. In combination with a traction engine, a draft attachment therefor including a single rigid bar rigidly attached to said engine perpendicular to the line of draft, means for independently connecting each of a series of cultivators to said bar to be drawn behind the same, each having its tongue supported by said bar, and a separate manually operated device operatively engaging each tongue and said bar arranged whereby when one of the devices is operated the tongue corresponding thereto will be moved laterally, with respect to the said bar.

5. In combination with a tractor having a member at its rear lying perpendicular to its line of draft, and an implement including a tongue extending forwardly therefrom, a guide movable along the member upon which the tongue is supported in pivotal manner, a take-up device mounted upon the tongue above the member, and mechanism connected to the device and the guide at opposite sides thereof operatively connected to the member at opposite sides of the guide and spaced therefrom.

6. In combination with a tractor having a member at its rear spaced therefrom in rigid relation perpendicular to the line of draft, an implement including a tongue extending forwardly therefrom, a guide engaging opposite sides of the member and movable along the same, the tongue being supported upon the guide and adapted to swing relatively thereto, a shaft journaled upon and extending along the tongue including a hand-wheel at one end, and a winding drum at the other end above the position of the said member, a pulley mounted on the member at each side of the guide and spaced from the same, and a cable engaging the drum, attached at its ends to opposite sides of the guide and extending over said pulleys.

In testimony whereof I affix my signature in presence of two witnesses.

CHARLES P. ZINSER.

Witnesses:
J. B. WOLFENBARGER,
L. M. THURLOW.